US005236274A

United States Patent [19]

Taniguchi

[11] Patent Number: 5,236,274

[45] Date of Patent: Aug. 17, 1993

[54] INSTALLATION OF WEAR-RESISTANT CHIP ON MECHANICAL PART

[75] Inventor: Masato Taniguchi, Aichi Prefecture, Japan

[73] Assignee: NGK Spark Plug Co., Ltd., Nagoya, Japan

[21] Appl. No.: 904,220

[22] Filed: Jun. 18, 1992

[30] Foreign Application Priority Data

Jun. 25, 1991 [JP] Japan ................................ 3-180403

[51] Int. Cl.$^5$ .......................... F01L 1/26; F01L 1/18; F16B 7/04

[52] U.S. Cl. .................................... 403/372; 123/90.4

[58] Field of Search ............... 123/90.4; 403/372, 371, 403/365, 366, 121; 175/428, 424, 317

[56] References Cited

U.S. PATENT DOCUMENTS 3,915,246 10/1975 Sheshtawy ......................... 175/317
4,981,390 1/1991 Cramer, Jr. et al. ........... 403/372 X

FOREIGN PATENT DOCUMENTS 63-202705 12/1988 Japan .
64-44303 3/1989 Japan .
2-114702 9/1990 Japan .

*Primary Examiner*—Randolph A. Reese
*Assistant Examiner*—Christopher J. Novosad
*Attorney, Agent, or Firm*—Foley & Lardner

[57] ABSTRACT

An annular space is formed between a circumferential wall of a wear-resistant chip and a circumferential wall of a recessed portion of a mechanical part. A resilient stopper in the form of a ring is installed in the annular space for resilient deformation between the circumferential wall of the wear-resistant chip and the circumferential wall of the recessed portion for thereby urging the wear-resistant chip and the recessed portion in opposite direction thereby fixing the wear-resistant chip to the recessed portion.

4 Claims, 4 Drawing Sheets

INSTALLATION OF WEAR-RESISTANT CHIP ON MECHANICAL PART

BACKGROUND OF THE INVENTION

1. Field of the Invention

The present invention relates to installation of a wear-resistant chip on a mechanical part such as a valve bridge, valve lifter, or the like part of a multi-valve engine which is required to have a good wear resistance at a portion for contact with another mechanical part.

2. Description of the Prior Art

A valve bridge for use in an engine of the type having four valves per each cylinder is shown in FIG. 7 as an example of a mechanical part of the above described kind.

The valve bridge "A" is a mechanical part which is pushed by an end of a rocker arm "B" for operating two valves "C" simultaneously. The valve bridge "A" and the rocker arm "B" are strongly rubbed against each other during the operation, of the engine and therefore liable to be worn out at the rubbed portions. In order to increase the wear resistance of a portion of the valve bridge "A", i.e., the portion for contact with the rocker arm "B", the valve bridge "A", as for example described in Japanese Utility Model Provisional Publication Nos. 63-202705 and 2-114702, has at a portion for contact with the rocker arm "B" a recess "D" in which a wear-resistant member "E" made of ceramics, or the like is installed.

In the structure disclosed by Japanese Utility Model Provisional Publication No. 63-202705, the wear-resistant member "E" is simply fitted in the recess "D". On the other hand, in the structure disclosed by Japanese Utility Model Provisional Publication No. 2-114702, a metallic intermediate member is interposed between the recess "D" and the wear-resistant member "E" and plastically deformed with a jig or tool such that the wear-resistant member "E" is fixedly held in the recess "D" by the effect of the plastically deformed intermediate, member.

A problem with the structure disclosed by Japanese Utility Model Provisional Publication No. 63-202705 is that the wear-resistant member "E" has a possibility of being dropped off from the recess "D" at the time of installation of the valve bridge "A" on the engine or at the time of maintenance of same, thus considerably deteriorating the working efficiency. When the recess "D" and the wear-resistant member "E" are more tightly fitted so that such dropping off does not occur, there is a necessity of grinding the peripheral portion of the wear-resistant member "E" to increase the dimensional accuracy, thus resulting in an increased manufacturing cost.

The structure disclosed by the Japanese Utility Model Provisional Publication No. 2-114702 is free from the above described problem since the wear-resistant member "E" is fixedly held by the intermediate member. However, this structure results in a high cost since a particular tool and a particular process for bending the intermediate member are necessitated and further since bending of the intermediate member may possibly cause a chipping of the wear-resistant member "E" particularly when the wear-resistant member "E" is made of ceramics or the like brittle material and may possibly cause a residual stress which deteriorates the durability.

SUMMARY OF THE INVENTION

In accordance with the present invention, there is provided a novel and improved mechanical part and wear-resistant chip assembly which comprises a mechanical part having a recessed portion, a wear-resistant chip received in the recessed portion to define a space between the recessed portion and the wear resistant chip, and resilient stopper means installed in the space for resilient deformation between the wear resistant chip and the recessed portion for thereby urging the wear resistant chip and the recessed portion in opposite directions thereby fixing the wear-resistant chip to the recessed portion.

The above structure is effective for solving the above noted problems inherent in the prior art structures.

It is accordingly an object of the present invention to provide a mechanical part and wear-resistant chip assembly which can assuredly prevent unintended removal of the wear-resistant chip during its installation on an engine or during maintenance of the engine while making it possible to attain installation of the wear-resistant chip on the mechanical part with ease and efficiency.

It is a further object of the present invention to provide a novel and improved mechanical part and wear resistant chip assembly of the above described character which can be assembled without requiring any particular jig and process.

It is a further object of the present invention to provide a novel and improved mechanical part and wear resistant chip assembly of the above described character which can assuredly prevent the wear-resistant chip from being tightened or compressed excessively and therefore can assuredly prevent chipping or cracking of the wear-resistant chip particularly when the wear-resistant chip is made of a brittle material such as ceramics and further can assuredly prevent deterioration of the durability due to residual stress.

It is a further object of the present invention to provide a novel and improved mechanical part and wear-resistant chip assembly which does not require grinding or polishing of the peripheral portion of the wear-resistant chip when the wear-resistant chip is made of ceramics and therefore can be low in cost.

DESCRIPTION OF PREFERRED EMBODIMENTS

Figure 1:
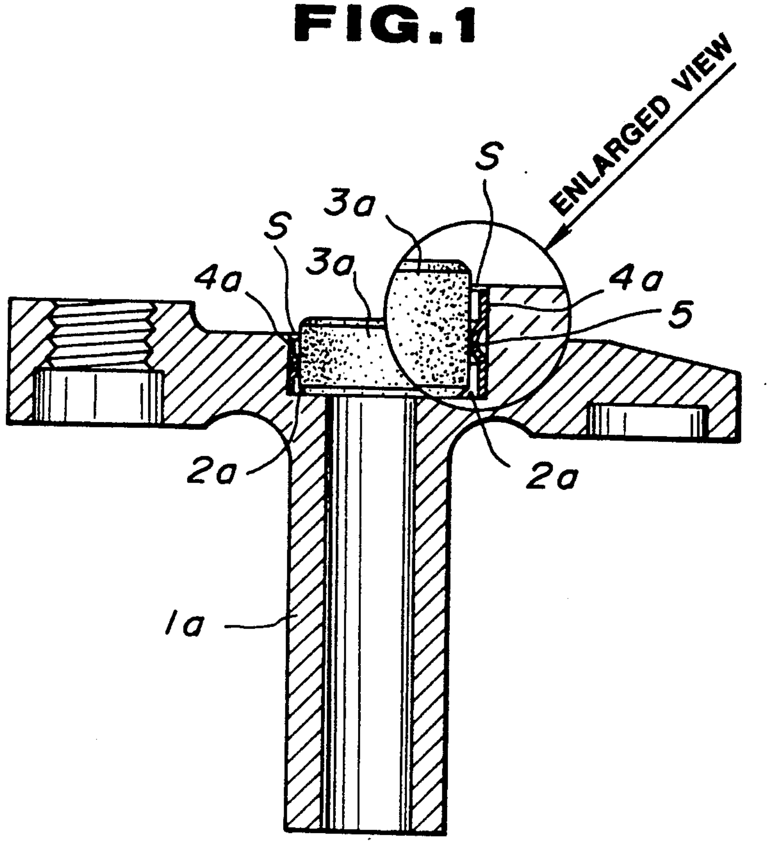
FIG. 1 is a sectional, partly enlarged view of a valve bridge according to an embodiment of the present invention.
Figure 2:
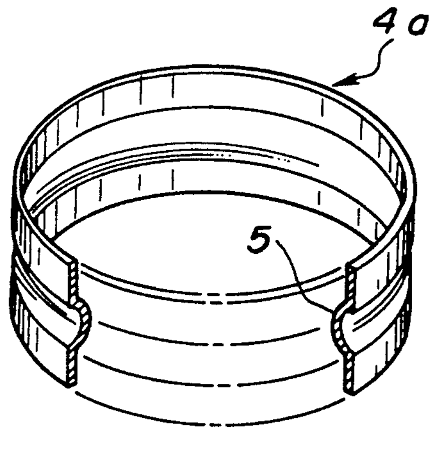
FIG. 2 is an enlarged perspective view of a stopper employed in the valve bridge of FIG. 1.
Figure 7:
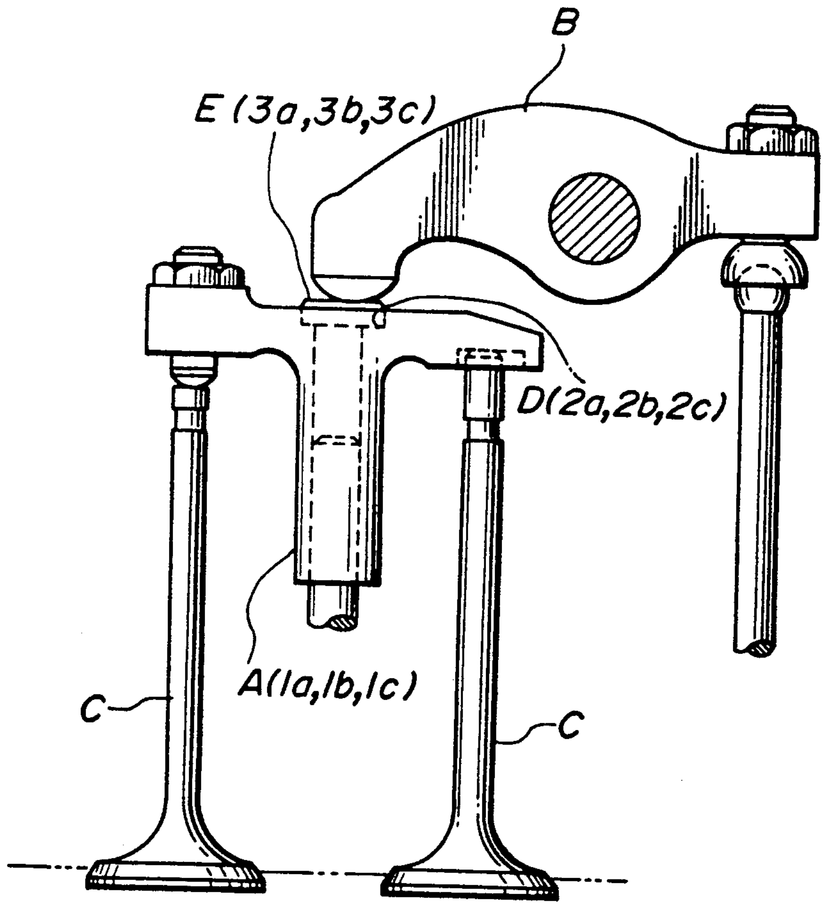
FIG. 7 is a elevational view of a valve operating device including a valve bridge to which the present invention is applicable.

Referring first to FIGS. 1 and 2, a valve bridge 1*a* has a T-like shape when viewed in a side elevation and is formed from steel such as S45C (carbon steel for machine structural use according to Japanese Industrial Standards). The valve bridge 1*a* is put into contact at a head portion with a rocker arm "B" as shown in FIG. 7 and formed at the head portion with a recess 2*a* of a circular cross section. The recess 2*a* is sized to be 10 mm in diameter (tolerance is between 0 and +0.5 mm) and 4 mm in depth.

A wear-resistant chip 3*a* to be fitted in the recess 2*a* is made of ceramics, i.e., formed from powders of 90 wt % of $Si_3N_4$ and 10 wt % of $Al_2O_3$—$Y_2O_3$ additives. The powders are mixed with binders and formed into a cylindrical compact with a diameter of 9.5 mm and a thickness of 5 mm by means of a press die. The compact is baked in the atmosphere of $N_2$ and under normal pressure. Only the upper and lower side surfaces of the baked article are polished by lapping. The wear-resistant chip 3*a* is produced in the above manner. The wear-resistant chip 3*a* is formed with chamfers of 0.5 mm at the corners due to the chamfered corners of the press die.

The recess 2*a* and the wear-resistant chip 3*a* are sized to provide an annular space "S" therebetween. The annular space "S" is sized to provide a clearance of 0.25 mm between the wear-resistant chip 3*a*. The wear-resistant chip 3*a* partially projects out of the recess 2*a* when installed in place in the recess 2*a*.

A stopper 4*a* as shown in FIG. 2 is inserted into the annular space "S". The stopper 4*a* is made of SPC (cold rolled steel according to Japanese Industrial Standards) and formed from a sheet with a thickness of 0.2 mm into a ring with a diameter of 10 mm (tolerance is between +0.5 mm and +0.1 mm by the use of press dies. The stopper 4*a* is formed with an internally bulged portion 5 of a semicircular cross section so as to have, by the effect of the bulged portion 5, an inner diameter of 9.4 mm (tolerance is between −0.1 mm and 0 mm).

In installation of the wear-resistant chip 3*a* on the valve bridge la, the stopper 4*a* is first inserted into the recess 2*a* of the valve bridge 1*a*. The wear-resistant chip 3*a* is then inserted into the stopper 4*a* having already been installed in the recess 2*a*. In this instance, since the inner diameter of the stopper 4*a* is sized to be a little smaller than the outer diameter of the wear-resistant chip 3*a* into the recess 2*a* causes the bulged portion 5 to be compressed and deformed resiliently. By the resilient deformation of the stopper 4*a* between the recess 2*a* and the wear-resistant chip 3*a*the recess 2*a* and the wear-resistant chip 3*a* are urged in opposite directions to increase the space "S" therebetween such that the stopper 4*a* serves as a connecter for fixing the wear-resistant chip 3*a* to the recess 2*a*.

In the foregoing, it will be understood that the work for such installation can be done with ease and efficiency without requiring any particular jig, tool or any particular process.

It will be further understood that once the valve bridge 1*a* is installed on the engine, the wear-resistant chip 3*a* is always held between the rocker arm "B. and the valve bridge 1*a*, thus eliminating a possibility of being dropped off from the recess 2*a* during operating of the engine.

Figure 3:
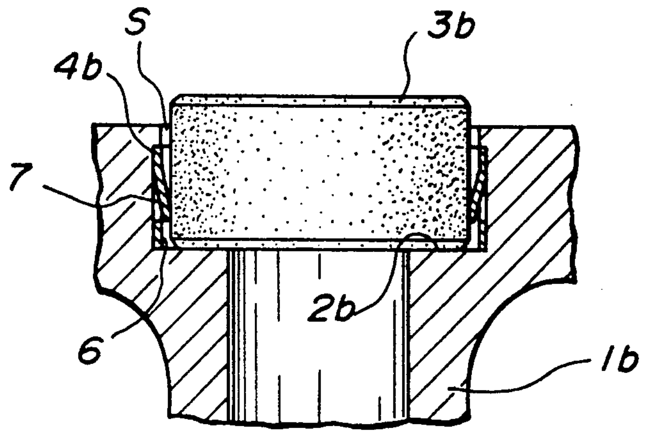
FIG. 3 is a fragmentary sectional view of a valve bridge according to another embodiment.
Figure 4:
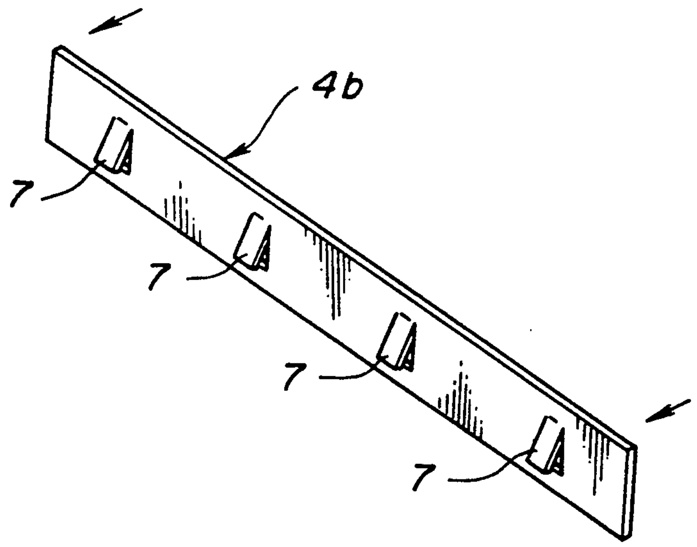
FIG. 4 is a perspective view of a stopper employed in the valve bridge of FIG. 3.

FIGS. 3 and 4 show another embodiment. In this embodiment, the valve bridge 1*b* is further formed with a groove 6 at the inner circumferential wall of the recess 2*b* so that the stopper 4*b* is received in the groove 6. The groove 6 is formed in the circumferential wall of the recess 2*a* so as to leave an upper end portion unchanged above the groove 6.

The stopper 4*b* is made of SPC and formed from a sheet with a width a little smaller than the height of the groove 6. The stopper 4*b* takes the form of being straight due to its resilience, as shown in FIG. 4 before installation, and has a length which is a little smaller than the circumference of the groove 6. The stopper 4*b* is provided with a plurality of fingers 7 with constant intervals therebetween. The fingers 7 are formed by the use of a press die, i.e., by simultaneous cutting and bending.

In installation of the wear-resistant chip 3*b*, forces are applied from the fingers of a worker to the opposite end portions of the stopper 4*b* in the directions indicated by the arrows in FIG. 4 such that the stopper 4*b* is bent into a ring and then inserted into the groove 6. When the worker takes his fingers off from the stopper 4*b*, the stopper 4*b* expands by the effect of its resilience and fits in the inner circumference of the groove 6. The stopper 4*b* is thereby prevented from being dropped off from the recess 2*b*. In the meantime, when the stopper 4*b* is installed in place, the fingers 7 are so positioned as to protrude radially inwardly increasingly as they extend toward the bottom of the recess 2*b*.

The wear-resistant chip 3*b* is then inserted into the recess 2*b*. In this instance, the fingers 7 are deformed resiliently to urge the wear-resistant chip 3*b* and the recess 2*b* in, the opposite directions to increase the space "S" for thereby fixing the wear-resistant chip 3*b* to the recess 2*b*.

The fingers 7 are slanted inwardly and downwardly such that there is caused an advantage that the wear-resistant chip 3*b* can be inserted into the recess 2*b* without any substantial resistance but the edges of the fingers 7 become effective for preventing removal of the wear-resistant chip 3*b*. Further, the stopper 4*b* is simple in structure and therefore cheap in cost.

Except for the above, this embodiment is substantially similar to the previous embodiment and can produce the substantially the same effect.

Figure 5:
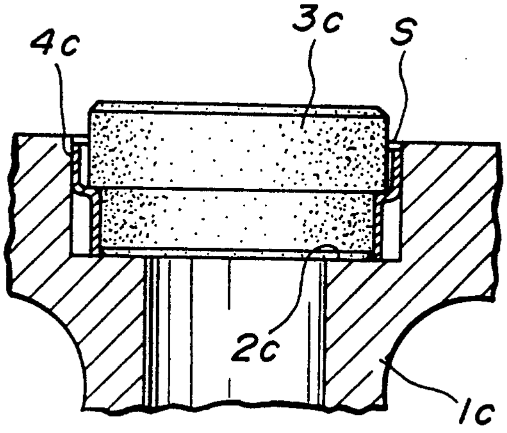
FIG. 5 is a view similar to FIG. 3 showing a further embodiment.
Figure 6:
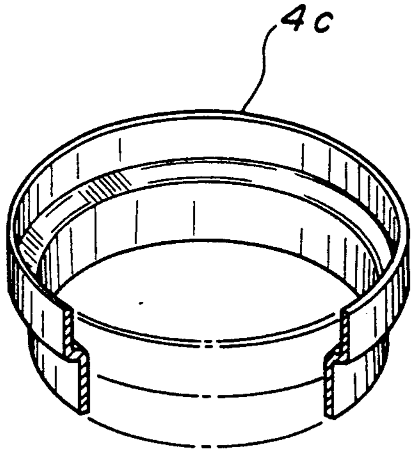
FIG. 6 is a perspective view of a stopper employed in the valve bridge of FIG. 5.

FIGS. 5 and 6 show another embodiment. In this embodiment, the wear-resistant chip 3*c* is made of ceramics, i.e., formed from a compact of PSZ (partially stabilized zirconia) including 3 mol. % of $Y_2O_3$ which is prepared by the use of a press die, then baked in open air and polished by lapping only at the upper and lower side surfaces. The wear-resistant chip 3*c* is in the form of a stepped cylinder having an upper half section of a larger diameter and a lower half section of a smaller diameter. The upper half section is sized to be 9.4 mm in diameter, the lower half section is sized to be 9 mm in diameter, and the overall thickness of the wear-resistant member 3*c* is 5 mm.

The stopper 4*c* is made of SPC similarly to the previous embodiment of FIGS. 3 and 4 and formed from a sheet with a thickness of 0.2 mm by the use of press dies, into a stepped ring having an upper half section of a larger diameter and a lower half section of a smaller diameter. The stopper 4*c* is sized to be 10 mm in diameter at the upper half section (tolerance is 1 and +0.5 mm), 8.9 mm in diameter at the lower half section (tolerance is between −0.1 and 0 mm), substantially the same in height at the lower half section with the lower half section of the wear-resistant member 3*c* and a little smaller in height at the upper half section than the upper half section of the wear-resistant member 3*c*.

In installation of the wear-resistant chip 3c on the valve bridge 1c, the stopper 4c is first installed on the lower half section of the wear-resistant chip 3c. In this instance, the lower half section of the wear-resistant chip 3c is forced into the lower half section of the stopper 4c since the lower half section of the stopper 4c is a little smaller in diameter than the lower half section of the wear-resistant chip 4c. The upper half section of the stopper 4c is 9.6 mm in inner diameter such that a clearance of about 0.2 mm is formed between the wear-resistant chip 3c and the stopper 4c.

The wear-resistant chip 3c on which the stopper 4c is fitted as above is inserted into the recess 2c of the valve bridge 1c. In this connection, since the outer diameter of the upper half section of the stopper 4c is a little larger than the inner diameter of the recess 2c, the stopper 4c is forced into the recess 2c and thus resiliently deformed a little for thereby being fixed in the recess 2c.

This embodiment effects an easy handling and a good working efficiency since the stopper 4c and the wear-resistant member 3c are assembled together prior to installation on the valve bridge 1c. Except for the above, this embodiment is substantially similar to the previous embodiment of FIGS. 1 and 2.

While the present invention has been described and shown as above, it is not for the purpose of limitation. For example, the present invention may be applied to a mechanical part other than the valve bridge, such as a valve lifter or the like part which is required to be partially increased in wear resistance. Further, the stopper may be made of a material other than cold rolled steel, such as a synthetic resin such as polypropylene, rubber, etc. In the case of the stopper being made of rubber, the stopper may take the form of an O-ring to produce the same effect.

What is claimed is:

1. A mechanical part and wear-resistant chip assembly comprising:

a mechanical part having a recessed portion;

a wear-resistant chip received in said recessed portion to define a space between said recessed portion and said wear-resistant chip; and resilient stopper means installed in said space for resilient deformation between said wear resistant chip and said recessed portion for thereby urging said wear resistant chip and said recessed portion in opposite directions and thereby fixing said wear-resistant chip to said recessed portion;

wherein said recessed portion is in the form of a circular hole and has a circumferential wall, said wear-resistant chip is cylindrical and has a circumferential wall, and said spaced is defined between said circumferential wall of said recessed portion and said circumferential wall of said wear-resistant chip; and wherein said stopper means comprises a resilient ring of a stepped shape having a larger diameter section and a smaller diameter section said wear-resistant chip has a stepped shape and has a larger diameter section and a smaller diameter section, and an inner diameter of said smaller diameter section of said resilient ring is a littler smaller than an outer diameter of said smaller diameter section of said wear-resistant chip while an outer diameter of said larger diameter section of said resilient ring is a little larger than an inner diameter of said recessed portion.

2. The assembly according to claim 1, wherein said wear resistant chip is made of ceramics.

3. The assembly according to claim 1, wherein said resilient ring is made of steel.

4. A device for installing a wear resistant chip on a mechanical part, comprising:

recess means provided in the mechanical part for receiving the wear-resistant chip and for providing a space between said recess means and the wear-resistant chip; and resilient stopper means installed in said space for resilient deformation between the wear resistant chip and said recess means for thereby urging the wear-resistant chip and said recess means in opposite directions and thereby fixing said wear-resistant chip to said recess means;

wherein said recess means comprises a recess of a circular cross section formed in the mechanical part and having a circumferential wall, the wear resistant chip is cylindrical and has a circumferential wall, and said space is defined between said circumferential wall of said recess and the circumferential wall of the wear-resistant chip;

wherein said stopper means comprises a resilient ring of a stepped shape having a larger diameter section and a smaller diameter section, the wear-resistant chip has a stepped shape and has a larger diameter section and a smaller diameter section, and an inner diameter of said smaller diameter section of said resilient ring is a little smaller than an outer diameter of the smaller diameter section of the wear-resistant chip while an outer diameter of said larger diameter section of said resilient ring is a little larger than an outer diameter of said recess.

* * * * *